United States Patent [19]

Okamura

[11] Patent Number: 5,226,596
[45] Date of Patent: Jul. 13, 1993

[54] HEATED NOZZLE FOR PLASTIC INJECTION AND MANUFACTURING METHOD THEREFOR

[75] Inventor: Isao Okamura, Sagamihara, Japan

[73] Assignee: Mold-Masters Kabushiki Kaisha, Kanagawa, Japan

[21] Appl. No.: 759,925

[22] Filed: Sep. 13, 1991

[30] Foreign Application Priority Data

Feb. 19, 1991 [JP] Japan .................... 3-46174

[51] Int. Cl.⁵ .................... B29C 45/00; B05B 1/24
[52] U.S. Cl. .................... 239/1; 239/133; 239/135; 219/421; 392/480; 425/549
[58] Field of Search .................... 239/132–135; 219/421, 230; 392/480, 484; 425/549; 165/64

[56] References Cited

U.S. PATENT DOCUMENTS

| | | | |
|---|---|---|---|
| 2,291,423 | 7/1942 | Tiscornia | 239/138 |
| 2,522,365 | 9/1950 | Greene | 392/480 |
| 2,875,312 | 2/1959 | Norton | 392/480 |
| 2,987,300 | 6/1961 | Greene | 392/484 |
| 4,557,685 | 12/1985 | Gellert | 239/132 |
| 4,635,851 | 1/1987 | Zecman | 239/133 |
| 4,644,140 | 2/1987 | Hillinger | 239/133 |
| 4,652,230 | 3/1987 | Osuna-Diaz | 425/549 |
| 4,771,164 | 9/1988 | Gellert | 219/421 |
| 4,945,630 | 8/1990 | Gellert | 425/549 |
| 4,981,431 | 1/1991 | Schmidt | 425/549 |

FOREIGN PATENT DOCUMENTS

| | | |
|---|---|---|
| 3046471 | 7/1982 | Fed. Rep. of Germany . |
| 3100092 | 7/1982 | Fed. Rep. of Germany ...... 239/133 |

*Primary Examiner*—Andres Kashnikow
*Assistant Examiner*—Karen B. Merritt
*Attorney, Agent, or Firm*—Dickstein, Shapiro & Morin

[57] ABSTRACT

The heat of a heater sheath wire is both the heat that is directly transmitted to a heated nozzle main body, and the heat that is indirectly transmitted to the heated nozzle main body via a metal strip and both provide the effect of efficiently heating the heated nozzle main body and producing a significant increase in the performance. The heated nozzle for plastic injection molding according to the present invention is configured so as to have a spiral-shaped groove on its outer periphery, the heater sheath wire that is pressed into the spiral-shaped groove and the metal strip that is wound around the surface of the outer periphery of the heated nozzle main body and is welded to the heated nozzle main body.

2 Claims, 3 Drawing Sheets

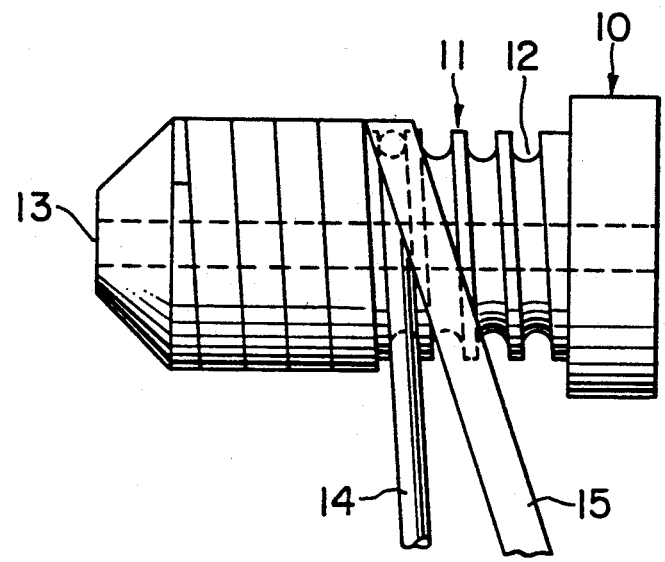
F I G. 1
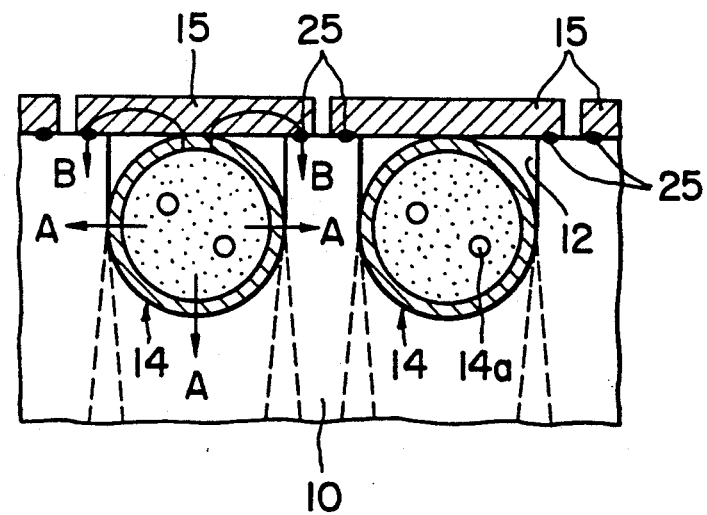
F I G. 2

HEATED NOZZLE FOR PLASTIC INJECTION AND MANUFACTURING METHOD THEREFOR

BACKGROUND OF THE INVENTION

The present invention relates to a heated nozzle for plastic injection molding and that is incorporated into an injection molding machine and a manufacturing method therefor.

As shown in FIGS. 4 and 5, this type of heated nozzle for plastic injection molding is provided with a coil-shaped heater 3 and a cylinder 4 external to the surface of the outer periphery of the cavity sleeve portion 2 of the heated nozzle main unit 1. The heat that is generated from the heated coil-shaped heater 3 and in the direction indicated by the arrow (See FIG. 4) heats the cavity sleeve portion 2 of the heated nozzle main unit 1 so that the molten plastic material that passes through the passage 5 provided to the cavity sleeve portion 2 is maintained within the allowable temperature range.

With such a heated nozzle for plastic injection molding, the heat that is generated from the coil-shaped heater 3 is transmitted to the cavity sleeve portion 2 via the contact surface between the cavity sleeve portion 2 and the inner surface of the coil-shaped heater 3 and the contact surface area is a factor for increasing the ratio of thermal conductivity but there is a structural limit to the degree to which the contact surface area can be made larger, and so there is a limit to the degree to which the ratio of thermal conductivity can be made larger. Because of this, heating the cavity sleeve portion 2 to the required temperature involves raising the temperature of the coil-shaped heater 3, but raising the temperature of the coil-shaped heater 3 shortens the life of the coil-shaped heater 3 and results in less years of use.

SUMMARY OF THE INVENTION

In the light of this problem, the present invention has as an object the increasing of the contact surface area between the heater sheath wire and the heated nozzle main body, and providing a heated nozzle for plastic injection molding that is both compact and that has a good ratio of thermal conductivity.

The heated nozzle for plastic injection molding of the present invention is configured from a spiral groove to the surface of its outer periphery, a heater sheath wire pressed into the spiral groove of the heated nozzle main body, and a metal strip that winds around the surface of the outer periphery of the heated nozzle main body of the heated nozzle and is welded to the heated nozzle main body so as to cover the heater sheath wire.

The heated nozzle for plastic injection molding of the present invention has a heater sheath wire pressed into a spiral groove of the heater nozzle main body, and the contact surface area of the spiral groove is increased so that the ratio of thermal conductivity from the heater sheath wire to the heated nozzle main body is increased. Furthermore, the metal strip that covers the heater sheath wire is in contact with the surface of the outer periphery that covers the outer surface of the heated nozzle main body and is also welded so that the heat of the heater sheath wire is transmitted to the heated nozzle main body via the metal strip, resulting in the heated nozzle characteristics being improved by these two systems of heat transfer.

BRIEF DESCRIPTION OF DRAWINGS

FIG. 1 is a view describing the status midway through the manufacture of the heated nozzle for plastic injection molding according to the present invention;

FIG. 2 is an enlarged sectional view describing one portion of the heated nozzle for plastic injection molding according to the present invention;

DETAILED DESCRIPTION OF THE PREFERRED EMBODIMENTS

Figure 3:
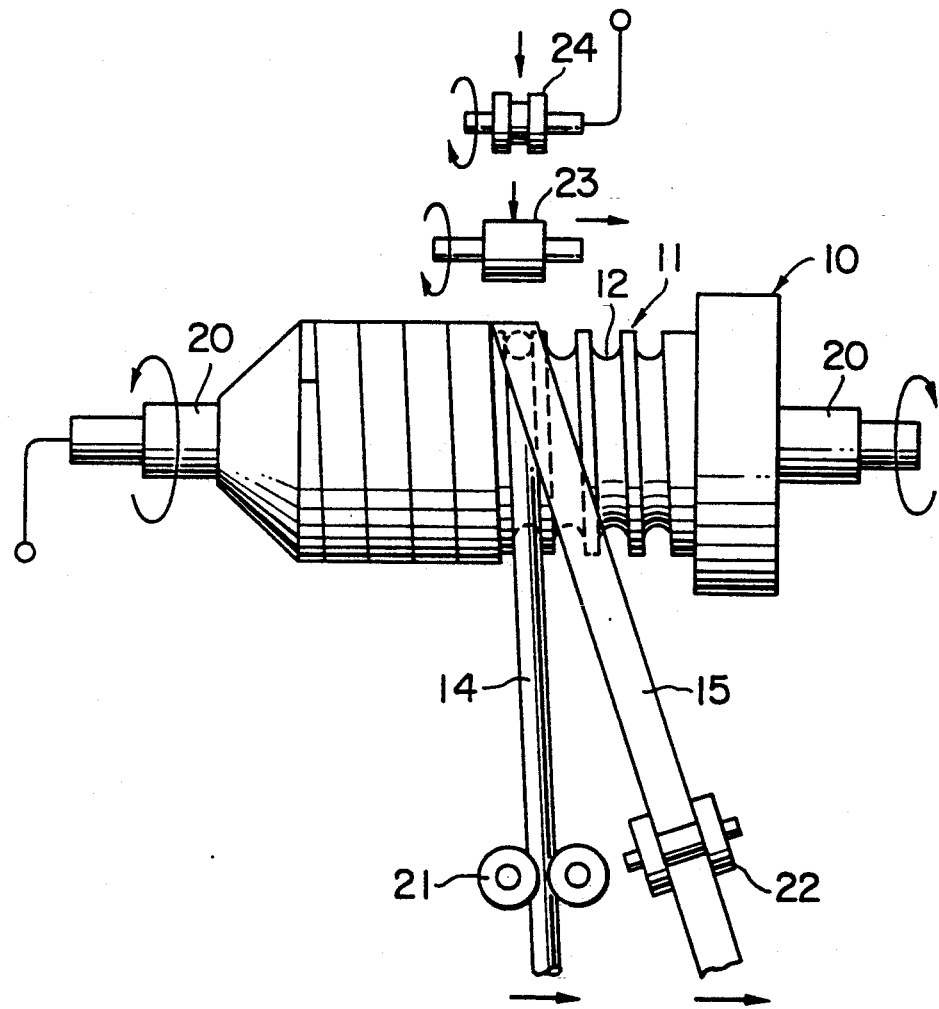
FIG. 3 is a view describing the procedures for the manufacture of a conventional heated nozzle for plastic injection molding.
Figure 4:
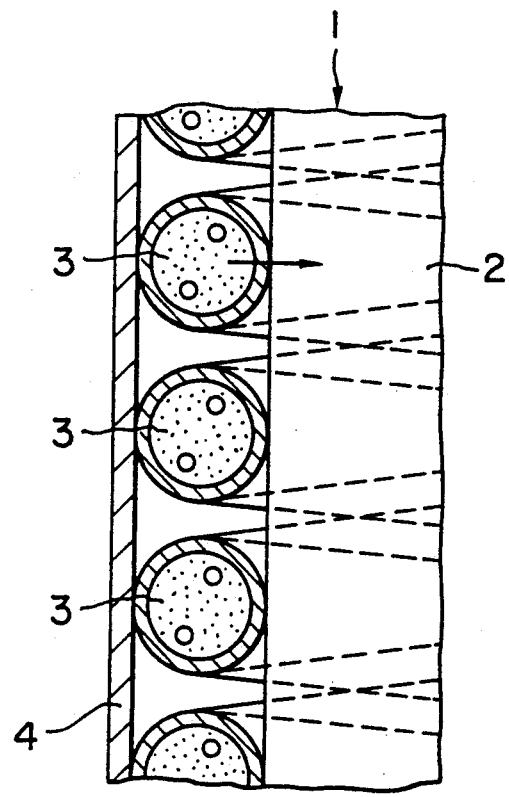
FIG. 4 is a view describing the procedures for the manufacture of a conventional heated nozzle for plastic injection molding according to the present invention.
Figure 5:
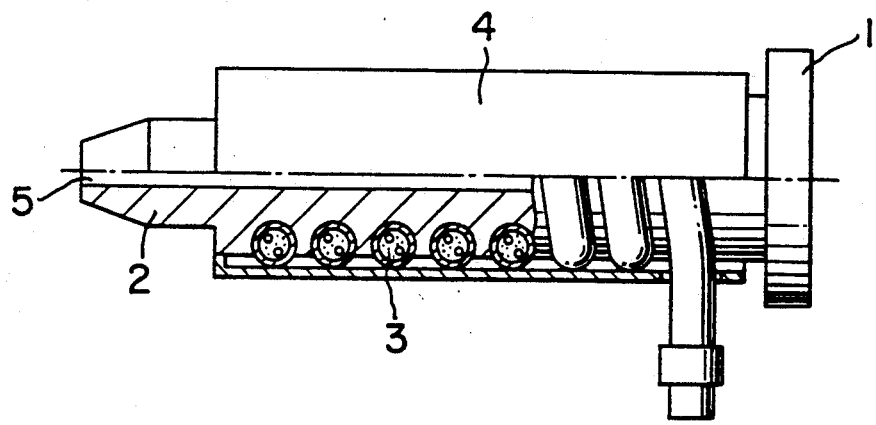
FIG. 5 is a view describing a conventional heated nozzle for plastic injection molding.

A preferred embodiment of the present invention will become understood from the following detailed description referring to the accompanying drawings.

In FIG. 1, the numeral 10 denotes a heated nozzle main body of a heated nozzle for plastic injection molding, and to the outer peripheral surface of a cavity sleeve portion 11 of this heated nozzle main body 10 is formed a single spiral-shaped groove 12 from the distal end portion to the base end portion. In addition, a path 13 through which plastic molding material flows extends in the axial direction to the center of the cavity sleeve portion 11. This spiral-shaped groove 12 of the cavity sleeve portion 11 has a heater sheath wire 14 wound around it and mounted. The sectional area of the heater sheath wire 14 is set so that it is a value which is practically equal to the surface area of the spiral-shaped groove 12.

Because of this, in the status where the heater sheath wire 14 is mounted to the spiral-shaped groove 12 of the cavity sleeve portion 11, one portion of the heater sheath wire 14 is in the state where it protrudes from the spiral-shaped groove 12. Then, on top of the heater sheath wire 14 that is fitted to the spiral-shaped groove 12 is wound a thin metal strip 15 so as to cover the heater sheath wire 14. The thin metal strip 15 is wound from one end to the other end of the cavity sleeve portion 11 while being pressed and so the heater sheath wire 14 is pressed into the spiral-shaped groove 12 of the cavity sleeve portion 11.

The following is a description of the method of manufacture of a heated nozzle for plastic injection molding.

As shown in FIG. 3, the heated nozzle main body 10 provided with a spiral-shaped groove 12 to the cavity sleeve portion 11 is supported by bearings 20, 20 of the winding apparatus and so as to be freely rotatable. The winding apparatus is provided with a pressure roller 23 that moves parallel to the line of the axis of the heated nozzle main body 10 and the guide fittings 21 and 22 that move along the line of the axis of the heated nozzle main body 10. The guide fitting 21 guides the heater sheath wire 14 and the guide fitting 22 guides the thin metal strip 15 while the pressure roller 23 presses the thin metal strip 15 that is wound around.

Then, the distal end of the heater sheath wire 14 that is guided by the guide fitting 21 is fixed to one end of the spiral-shaped groove 12 of the cavity sleeve portion 11 that is provided to the heated nozzle main body 10 and the thin metal strip 15 that is guided by the guide fitting 22 is arranged so as to cover the heater sheath wire 14 that has been mounted to the spiral-shaped groove 12, the heated nozzle main body 10 and the pressure roller 23 are rotated in the direction shown by the arrow of FIG. 3, and at the same time as this, the guide fitting 21, the guide fitting 22 and the pressure roller 23 are moved in the direction shown by the arrow as shown in FIG. 3.

The operation of each of the parts described above presses the heater sheath wire 14 into the spiral-shaped groove 12 of the cavity sleeve portion 11 provided to the heated nozzle main body 10 and winds the thin metal strip 15 so as to cover the heater sheath wire 14. The wound thin metal strip 15 is either spot welded or line welded by a roller electrode to a suitable portion of the cavity sleeve portion 11. This welded portion is shown by the numeral 25 in FIG. 2.

FIG. 2 shows a heated nozzle for plastic injection molding that has been made in this manner. The heater sheath wire 14 of the heated nozzle for plastic injection molding maintains the status where it is pressed into the spiral-shaped groove 12 of the cavity sleeve portion 11 and the thin metal strip 15 that covers the heater sheath wire 14 is welded to the cavity sleeve portion 11 by the roller electrode 24 so that the thin metal strip 15 is linked as a unit with the cavity sleeve portion 11 so that it neither loosens nor separates.

In addition, this heated nozzle for plastic injection molding operates in the same manner and can of course be used as a heated nozzle for hot runner.

Moreover, the heater sheath wire 14 shown in FIG. 2 has two heater wires 14a inside it but the number of these heater wires can be varied in accordance with necessity.

However, the heat that is generated from the heater sheath wire 14 of the heated nozzle for plastic injection molding is divided into that which is directly transmitted to the cavity sleeve portion 11 in the direction shown by the letter A of FIG. 2, and that which is indirectly transmitted to the cavity sleeve portion 11 via the thin metal strip 15 and in the direction shown by the letter B of FIG. 2, and heats the cavity sleeve portion 11.

According to the present invention as has been described above, the heated nozzle main body is provided with a spiral-shaped groove on its outer periphery, a heater sheath wire that is pressed into this spiral-shaped groove of the heated nozzle main body and a metal strip that is wound around the surface of the outer periphery of the heated nozzle main body and is welded to the heated nozzle main body and so the heat of the heater sheath wire is both the heat that is directly transmitted to the heated nozzle main body, and the heat that is indirectly transmitted to the heated nozzle main body via the metal strip and both provide the effect of efficiently heating the heated nozzle main body and producing a significant increase in the performance.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A heated nozzle for plastic injection molding, comprising a heated nozzle main body that is provided at a cavity sleeve portion thereof with a spiral groove in the surface of its outer periphery, a heater sheath wire pressed into said spiral groove, and a metal strip that winds around the surface of the other periphery of said heater sheath wire and is welded to the surface of the outer periphery of said cavity sleeve portion of said heated nozzle main body at locations other than at said spiral groove.

2. A method for the manufacturing of a heated nozzle for plastic injection molding, comprising the steps of:
   providing a heated nozzle main body having a cavity sleeve portion, said cavity sleeve portion being provided with a spiral groove in the surface of its outer periphery;
   supporting said heated nozzle main body to a winding apparatus;
   pressing a heater sheath wire into said spiral groove of said cavity sleeve portion of said heated nozzle main body;
   winding a metal strip around the surface of the outer periphery of said heater sheath wire; and
   welding said metal strip to the surface of the outer periphery of said cavity sleeve portion of said heated nozzle main body at locations other than at said spiral groove.

* * * * *